(12) United States Patent
Washburn

(10) Patent No.: US 9,722,880 B2
(45) Date of Patent: *Aug. 1, 2017

(54) ECMP PATH TRACING IN AN MPLS ENABLED NETWORK

(71) Applicant: AT&T INTELLECTUAL PROPERTY I, LP, Atlanta, GA (US)

(72) Inventor: Raymond Washburn, Allenwood, NJ (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/096,900

(22) Filed: Apr. 12, 2016

(65) Prior Publication Data

US 2016/0226721 A1    Aug. 4, 2016

Related U.S. Application Data

(63) Continuation of application No. 11/966,149, filed on Dec. 28, 2007, now Pat. No. 9,338,083.

(51) Int. Cl.

| | |
|---|---|
| H04L 12/28 | (2006.01) |
| H04L 12/24 | (2006.01) |
| H04L 12/751 | (2013.01) |
| H04L 12/721 | (2013.01) |
| H04L 12/723 | (2013.01) |

(52) U.S. Cl.
CPC .............. *H04L 41/22* (2013.01); *H04L 41/12* (2013.01); *H04L 41/5074* (2013.01); *H04L 45/02* (2013.01); *H04L 45/26* (2013.01); *H04L 45/50* (2013.01); *H04L 41/06* (2013.01)

(58) Field of Classification Search
CPC ......... H04L 45/50; H04L 45/28; H04L 45/74; H04L 41/0654; H04L 41/082; H04L 45/02; H04L 45/12; H04L 45/42; H04W 24/08
USPC ........ 370/235, 238, 254, 348, 351–356, 386
See application file for complete search history.

(56) References Cited

U.S. PATENT DOCUMENTS

| | | | |
|---|---|---|---|
| 6,108,702 | A | 8/2000 | Wood |
| 6,704,319 | B1 | 3/2004 | Durham et al. |
| 7,120,118 | B2 | 10/2006 | Rajagopal et al. |
| 7,707,307 | B2 | 4/2010 | Miles et al. |
| 2003/0161338 | A1 | 8/2003 | Ng et al. |
| 2004/0218542 | A1 | 11/2004 | Lee et al. |
| 2005/0182034 | A1* | 8/2005 | DeLuca ............... A61K 31/335 514/167 |
| 2006/0182034 | A1 | 8/2006 | Klinker et al. |
| 2006/0198321 | A1 | 9/2006 | Nadeau et al. |
| 2006/0198695 | A1 | 9/2006 | Kano et al. |
| 2007/0005277 | A1 | 1/2007 | Bickel et al. |
| 2007/0025241 | A1 | 2/2007 | Nadeau et al. |

(Continued)

*Primary Examiner* — Melanie Jagannathan
*Assistant Examiner* — Najeebuddin Ansari
(74) *Attorney, Agent, or Firm* — Hoffmann & Baron, LLP

(57) ABSTRACT

The preferred embodiments of the present invention are directed to a network tracing engine for tracing and depicting a topology (i.e. a network configuration) of a network using, for example, a network diagram. The network tracing engine preferably queries/telnets to interfaces of routers associated with one or more source-to-destination paths in a network concurrently and independently to ensure proper configuration of the routers and/or to generate a true depiction of a routing configuration without redundantly querying routers.

17 Claims, 15 Drawing Sheets

(56) References Cited

U.S. PATENT DOCUMENTS

| | | | |
|---|---|---|---|
| 2007/0025277 A1* | 2/2007 | Sajassi | H04L 45/26 370/256 |
| 2008/0225712 A1 | 9/2008 | Lange et al. | |
| 2008/0225741 A1 | 9/2008 | Venkateswaran et al. | |
| 2008/0250964 A1 | 10/2008 | Tamisier et al. | |

* cited by examiner

*FIG. 3A*  225a

```xml
<xs:schema xmlns:xs="http://www.w3.org/2001/XMLSchema">
    <xs:element name="LDPTraceReport" type="LDPTraceReportType"/>
    <xs:complexType name="LDPTraceReportType">
        <xs:sequence>
            <xs:element name="TraceID" type="xs:string"/>
            <xs:element name="StartTime" type="xs:dateTime"/>
            <xs:element name="EndTime" type="xs:dateTime"/>
            <xs:element name="Source" type="xs:string"/>
            <xs:element name="Destination" type="xs:string"/>
            <xs:element name="Error" type="xs:string" minOccurs="0"/>
            <xs:element name="LDPDisabledNodes" type="LDPDisabledNodesType" minOccurs="0" maxOccurs="1"/>
            <xs:element name="LabelDiscrepancies" type="LabelDiscrepanciesType" minOccurs="0" maxOccurs="1"/>
            <xs:element name="StartNode" type="NodeType"/>
        </xs:sequence>
    </xs:complexType>
    <xs:complexType name="NodeType">
        <xs:sequence>
            <xs:element name="Hostname" type="xs:string"/>
            <xs:element name="IntfceNameIn" type="xs:string"/>
            <xs:element name="IntfceAddrIn" type="xs:string"/>
            <xs:element name="IntfceNameOut" type="xs:string"/>
            <xs:element name="IntfceAddrOut" type="xs:string"/>
            <xs:element name="Type" type="xs:string"/>
            <xs:element name="LDPStatus" type="xs:string" minOccurs="0" maxOccurs="1"/>
            <xs:element name="InLabel" type="xs:string" minOccurs="0" maxOccurs="1"/>
            <xs:element name="OutLabel" type="xs:string" minOccurs="0" maxOccurs="1"/>
            <xs:element name="Error" type="xs:string" minOccurs="0" maxOccurs="1"/>
            <xs:element name="NextHop" type="NextHopsType" minOccurs="0" maxOccurs="1"/>
        </xs:sequence>
```

CONTINUED ON FIG.3B

*FIG. 3B*  CONTINUED FROM FIG.3A  225a

```
</xs:complexType>
    <xs.complexType name="NextHopsType">
        <xs:sequence>
            <xs.element name="Hop" type="NodeType" minOccurs="1"
                maxOccurs="unbounded"/>
        </xs:sequence>
    </xs.complexType>
    <xs.complexType name="LDPDisabledNodesType">
        <xs:sequence>
            <xs.element name="LDPDisabledNode"
                type="LDPDisabledNodeType" minOccurs="1"
                maxOccurs="unbounded"/>
        </xs:sequence>
    </xs.complexType>
    <xs.complexType name="LabelDiscrepanciesType">
        <xs:sequence>
            <xs.element name="LAbelDiscrepancy"
                type="LabelDiscrepancyType" minOccurs="1"
                maxOccurs="unbounded"/>
        </xs:sequence>
    </xs.complexType>
    <xs.complexType name="LDPDisabledNodesType">
        <xs:sequence>
            <xs.element name="Hostname" type="xs:string"/>
            <xs.element name="IntfceName" type="xs:string"/>
        </xs:sequence>
    </xs.complexType>
    <xs.complexType name="LabelDiscrepanceType">
        <xs:sequence>
            <xs.element name="OutNode" type="xs:string"/>
            <xs.element name="OutLabel" type="xs:string"/>
            <xs.element name="InNode" type="xs:string"/>
            <xs.element name="InLabel" type="xs:string"/>
        </xs:sequence>
    </xs.complexType>
</xs:schema>
```

*FIG. 3C*

```
<xs:schema xmlns:xs="http://www.w3.org/2001/XMLSchema">                    225b
    <xs:element name="LDPTraceStreamStart" type="LDPTraceStreamStartType"/>
    <xs:element name="LDPTraceStreamEnd" type="LDPTraceStreamEndType"/>
    <xs:element name="NodeReport" type="NodeReportType"/>
    <xs:complexType name="LDPTraceStreamStartType">
        <xs:sequence>
                    <xs:element name="TraceID" type="xs:string"/>
                    <xs:element name="StartTime" type="xs:dateTime"/>
                    <xs:element name="Source" type="xs:string"/>
                    <xs:element name="Destination" type="xs:string"/>
        </xs:sequence>
    </xs:complexType>
    <xs:complexType name="NodeType">
        <xs:sequence>
                    <xs:element name="TraceID" type="xs:string"/>
                    <xs:element name="StartTime" type="xs:dateTime"/>
                    <xs:element name="EndTime" type="xs:dateTime"/>
                    <xs:element name="Source" type="xs:string"/>
                    <xs:element name="Destination" type="xs:string"/>
                    <xs:element name="Error" type="xs:string" minOccurs="0"/>
        </xs:sequence>
    </xs:complexType>
    <xs:complexType name="NodeReportType">
        <xs:sequence>
                    <xs:element name="TraceID" type="xs:string"/>
                    <xs:element name="HopAddr" type="xs:string"/>
                    <xs:element name="HopIntfceName" type="xs:string"/>
                    <xs:element name="Hostname" type="xs:string"/>
                    <xs:element name="IntfceAddr" type="xs:string"/>
                    <xs:element name="Type" type="xs:string"/>
                    <xs:element name="LDPStatus" type="xs:string"
                        minOccurs="0" maxOccurs="1"/>
                    <xs:element name="InLabel" type="xs:string" minOccurs="0"
                        maxOccurs="1"/>
                    <xs:element name="OutLabel" type="xs:string"
                        minOccurs="0" maxOccurs="1"/>
                    <xs:element name="Error" type="xs:string" minOccurs="0"
                        maxOccurs="1"/>
                    <xs:element name="NextHopAddr" type="xs:string"
                        minOccurs="0" maxOccurs="unbounded"/>
        </xs:sequence>
    </xs:complexType>
</xs:schema>
```

```xml
<?xml version="1.0" encoding="UTF-8" standalone="yes"?>
<LDPTraceStreamStart>
    <TraceID/>
    <StartTime>2007-03-22T17:13:37.526+00:00</StartTime>
    <Source>acrar</Source>
    <Destination>mse-2</Destination>
</LDPTraceStreamStart>
<?xml version="1.0" encoding="UTF-8" standalone="yes"?>
<NodeReport>
    <TraceID/>
    <HopAddr>10.23.0.253</HopAddr>
    <HopIntfceName>Loopback0</HopIntfceName>
    <Hostname>acrar</Hostname>
    <IntfceName>Loopback10</IntfceName>
    <IntfceAddr>10.0.8.243</IntfceAddr>
    <Type>Cisco</Type>
<NodeReport>
<?xml version="1.0" encoding="UTF-8" standalone="yes"?>
<NodeReport>
    <TraceID/>
    <HopAddr>10.23.0.253</HopAddr>
    <HopIntfceName>Loopback0</HopIntfceName>
    <Hostname>acrar</Hostname>
    <IntfceName>POS 1/0/0</IntfceName>
    <IntfceAddr>10.23.0.10</IntfceAddr>
    <Type>Cisco</Type>
    <LDPStatus>1</LDPStatus>
    <InLabel>NA</InLabel>
    <OutLabel>NA</OutLabel>
    <NextHopAddr>10.23.0.9</NextHopAddr>
</NodeReport>
   . . .
```

FROM FIG.4A
    ...
    <?xml version="1.0" encoding="UTF-8' standalone="yes"?>
    <NodeReport>
        <TraceID/>
        <HopAddr>10.144.1.14</HopAddr>
        <HopIntfceName>POS9/0</HopIntfceName>
        <Hostname>prgsr-2</Hostname>
        <IntfceName>Loopback0</IntfceName>
        <IntfceAddr>10.144.10.2</IntfceAddr>
        <Type>Cisco</Type>
        <NextHopAddr>10.144.10.2</NextHopAddr>
    </NodeReport>
    <?xml version="1.0" encoding="UTF-8' standalone="yes"?>
    <NodeReport>
        <TraceID/>
        <HopAddr>10.144.1.10</HopAddr>
        <HopIntfceName>POS0/0</HopIntfceName>
        <Hostname>prgsr-2</Hostname>
        <IntfceName>Loopback0</IntfceName>
        <IntfceAddr>10.144.10.2</IntfceAddr>
        <Type>Cisco</Type>
        <NextHopAddr>10.144.10.2</NextHopAddr>
    </NodeReport>
    <?xml version="1.0" encoding="UTF-8' standalone="yes"?>
    <LDPTraceStreamEnd>
        <TraceID/>
        <StartTime>2007-03-22T17:13:37.526+00:00</StartTime>
        <EndTime>2007-03-22T17:16:07.836+00:00</EndTime>
        <Source>acrar</Source>
        <Destination>mse-2</Destination>
    </LDPTraceStreamEnd>

FIG. 4B

```
                                                               224b
<?xml version="1.0" encoding="UTF-8' standalone="yes"?>
<LDPTraceReport>
   <TraceID/>
   <StartTime>2007-03-22T17:13:37.526+00:00</StartTime>
   <EndTime>2007-03-22T17:16:07.836+00:00</EndTime>
   <Source>acrar</Source>
   <Destination>mse-2</Destination>
   <StartNode>
      <Hostname>acrar</Hostname>
      <IntfceNamein>Loopback10</IntfceNamein>
      <IntfceAddrin>10.23.0.253</IntfceAddrin>
      <IntfceNameOut>Loopback10</IntfceNameOut>
      <IntfceAddrOut>10.0.8.243</IntfceAddrOut>
      <Type>Cisco</Type>
      <NextHops>
       <Hops>
         <Hostname>acrar</Hostname>
         <IntfceNamein>POS5/7</IntfceNamein>
         <IntfceAddrin>10.23.0.13</IntfceAddrin>
         <IntfceNameOut>POS11/0/0/7</IntfceNameOut>
         <IntfceAddrOut>10.23.0.14</IntfceAddrOut>
         <Type>Cisco</Type>
         <LDPStatus>1</LDPStatus>
         <InLabel>NA</InLabel>
         <OutLabel>NA</OutLabel>
         <NextHops>
          <Hop>
```

FROM FIG.4B          224b

```
<Hostname>acrar2</Hostname>
<IntfceNamein>POS 1/7/2</IntfceNamein>
<IntfceAddrin>10.0.1.86</IntfceAddrin>
<IntfceNameOut>POS6/0</IntfceNameOut>
<IntfceAddrOut>10..0.1.85</IntfceAddrOut>
<Type>Cisco</Type>
<LDPStatus>1</LDPStatus>
<InLabel>348</InLabel>
<OutLabel>32721</OutLabel>
<NextHops>
 . . .
<Hostname>acrar</Hostname>
<IntfceNamein>POS5/7</IntfceNamein>
<IntfceAddrin>10.23.0.9</IntfceAddrin>
<IntfceNameOut>POS1/0/0</IntfceNameOut>
<IntfceAddrOut>10.23.0.10</IntfceAddrOut>
<Type>Cisco</Type>
<LDPStatus>1</LDPStatus>
<InLabel>NA</InLabel>
<OutLabel>NA</OutLabel>
<NextHops>
  <Hop>
    <Hostname>achr1</Hostname>
```

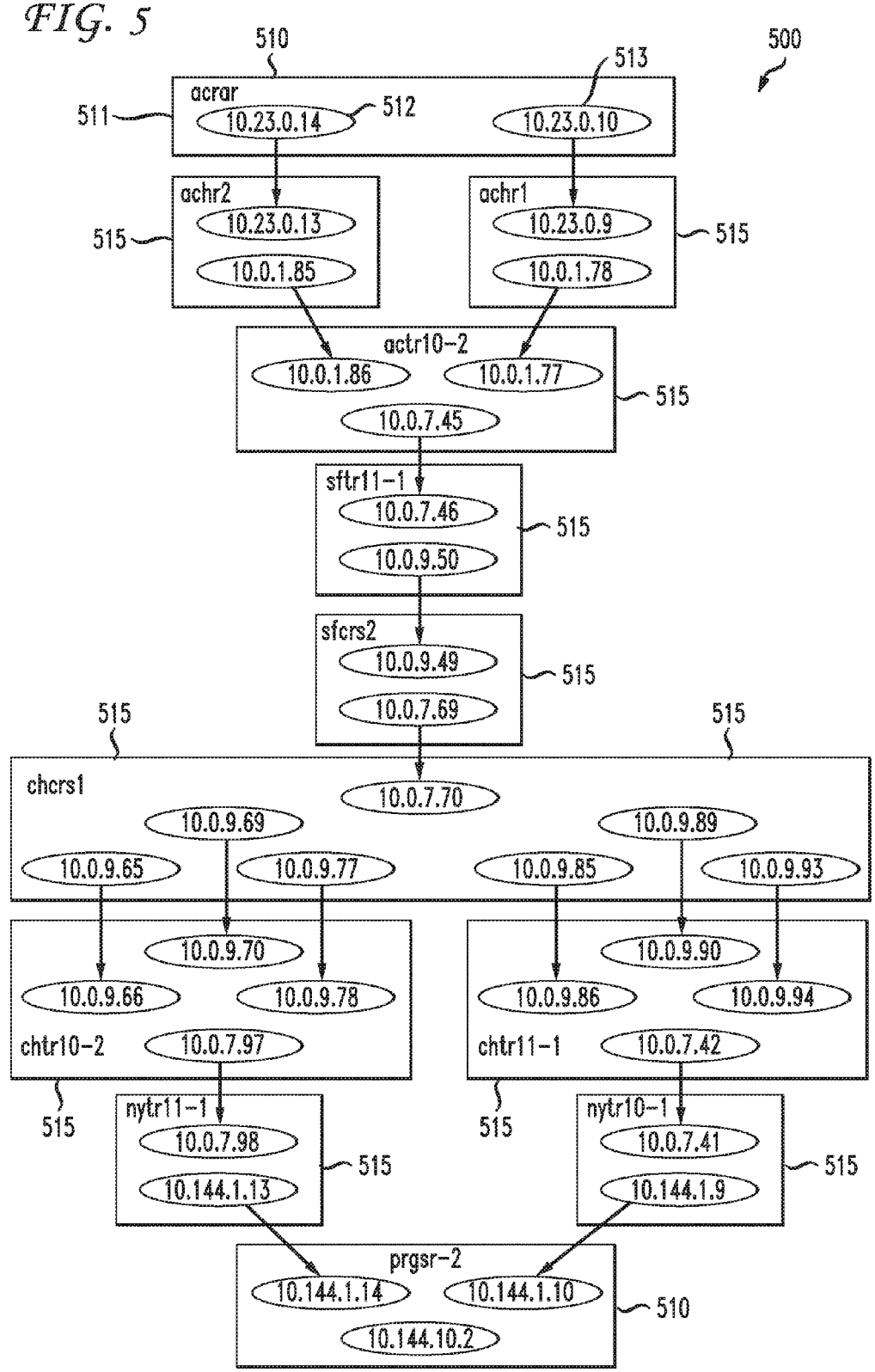

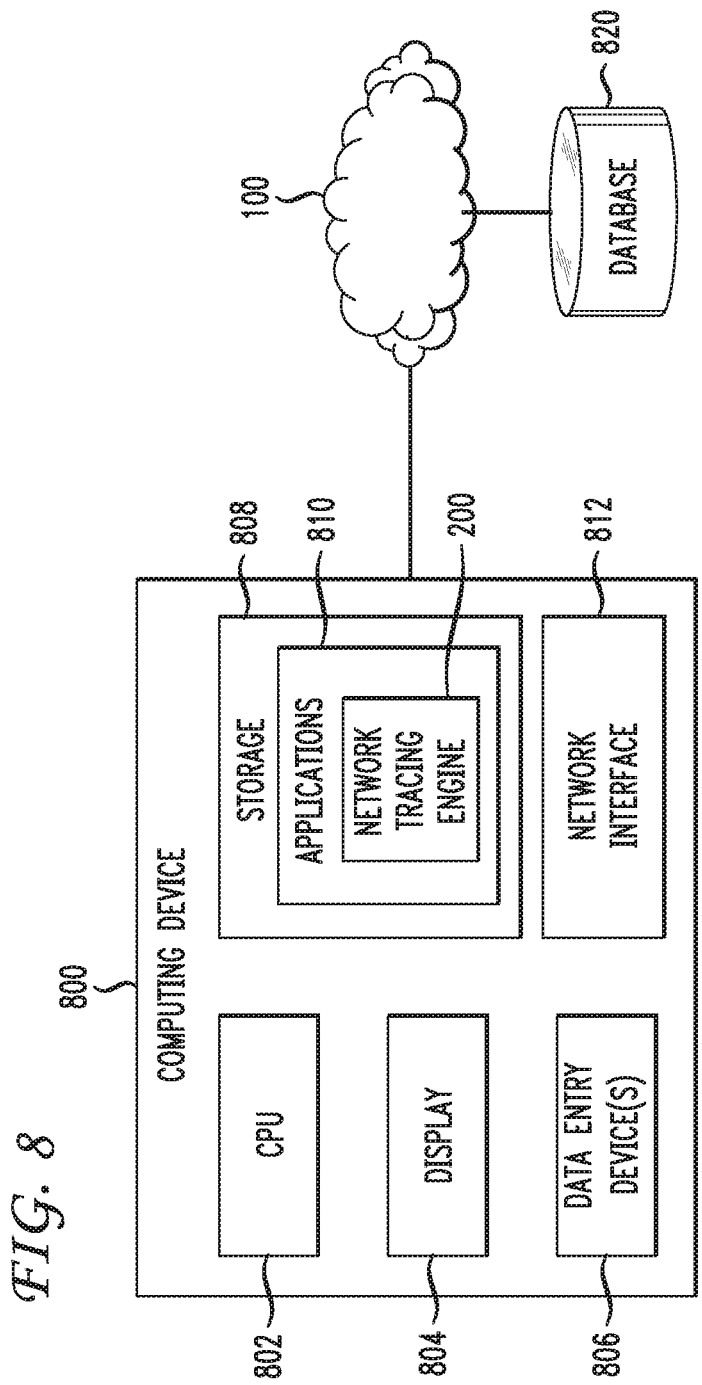

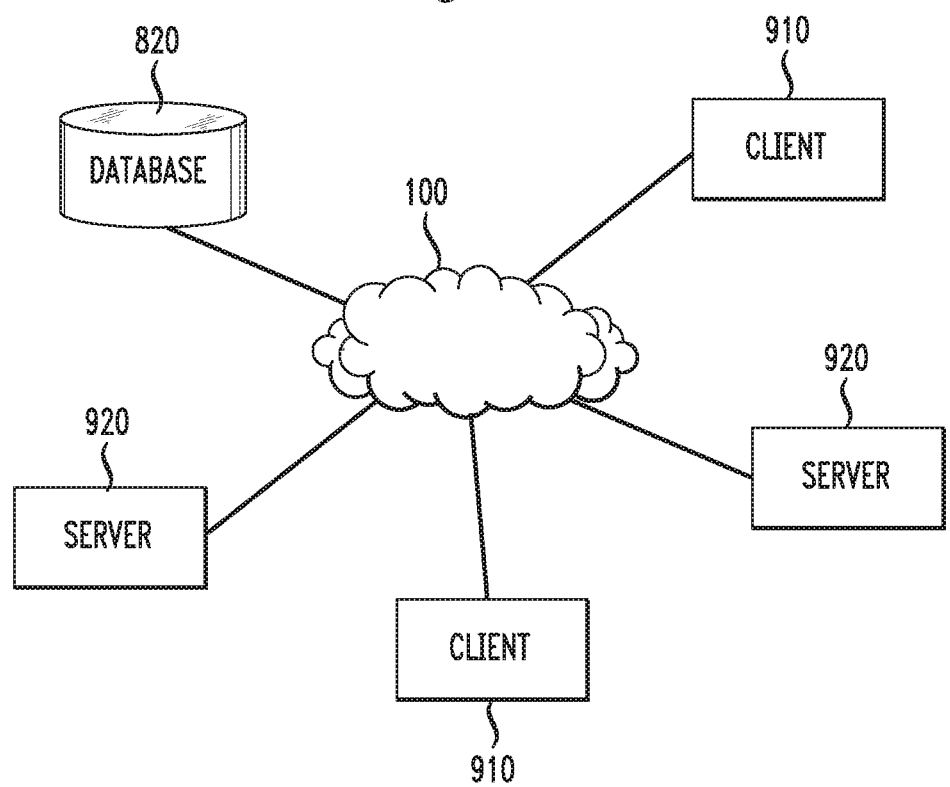

ECMP PATH TRACING IN AN MPLS ENABLED NETWORK

CROSS-REFERENCE TO RELATED APPLICATIONS

This application is a continuation of and claims priority to U.S. patent application Ser. No. 11/966,149, filed Dec. 28, 2007, by Washburn, entitled "ECMP Path Tracing in an MPLS Enabled Network". The contents of each of the foregoing is hereby incorporated by reference into this application as if set forth herein in full.

FIELD OF THE INVENTION

The present invention is directed to tracing a MPLS enabled network and to graphically depicting a network configuration based on the tracing.

BRIEF DESCRIPTION OF THE RELATED ART

Internet Protocol (IP) networks may implement Multi-Protocol Label Switching (MPLS) to ensure that packets in a selected flow follow the same route through the networks backbone. In such networks, data packets include routing information that determines the path the data packet follows through the network. To achieve this, MPLS routers attach labels containing forwarding information to data packets before the data packets leave the routers. These MPLS routers are generally located at the periphery of the network and generally perform packet analysis and classification before data packets enter the core of the network. The Label Switch Routers (LSRs) are generally located within the core of the network. These LSRs examine labels assigned to data packets by the MPLS routers and forward the data packets in accordance with the labels. Thus, the LSRs generally are not required to look up information in, for example, routing tables and generally are not required to compute path forwarding information for each data packet. Once a data packet traverses the network and reaches its destination, the edge router at the destination removes the label.

A fundamental concept in successful operation of Multi-Protocol Label Switching (MPLS) networks is that two Label Switch Routers (LSRs) must agree on the meaning of labels used to forward traffic between and through them. This common understanding is achieved by a set of procedures, called Label Distribution Protocol (LDP), by which one LSR informs the other of the label bindings it has made. LDP is a set of procedures and messages by which LSRs establish Label Switched Paths (LSPs) through the network by mapping the network-layer routing information directly to the data-link layer switched paths.

Conventional approaches for tracing a network generally traverse a network by checking each router in sequence, as each path is traversed. Nodes that are common to multiple paths are typically revisited each time they are encountered when tracing paths. The conventional approaches are typically very time consuming, especially as path complexity between endpoints (e.g., source and destination routers) increases. For example, these conventional approaches can require in excess of 45 minutes.

In addition, conventional approaches for conveying network configurations of a network based on result of the trace are typically textual or depicted graphically as a tree diagram. These techniques for conveying network configurations can be inaccurate and/or inefficient. For example, textual description of network configurations can be difficult to read and understand and tree diagrams may repetitively depict nodes that are used in multiple paths.

A new approach that traces routing paths in an IP MPLS network, which is efficient in time and cost is desirable. In addition, an intuitive and accurate portrayal of trace results using information obtained from the traces performed is also desired.

SUMMARY OF THE PREFERRED EMBODIMENTS

The preferred embodiments of the present invention are directed to a method, medium, and system for determining a network configuration representation. The preferred embodiments are preferably implemented by a computing device to obtain trace information associated with a plurality of equal cost paths and generate a network configuration representation using the trace information. The trace information is obtained concurrently from a plurality of routers associated with different equal cost paths.

Obtaining trace information can include obtaining trace information associated with a source router using a parent trace thread and obtaining trace information associated with the plurality of routers associated with different equal cost paths using at least one child trace thread associated with the parent trace thread. Trace information associated with at least one of the plurality of routers associated with different equal cost paths can be reused in response to at least two of the different of equal cost paths converging at the at least one of the plurality of routers. Trace information associated with a first router can be obtained by generating a first trace thread. Trace information associated with at least one second router in the plurality equal cost paths can be obtained using at least one second trace thread. The at least one second router can be connected to the first router. Trace information associated with at least one third router in the plurality equal cost paths can be obtained using at least one third trace thread. The at least one third router can be connected to the at least one second router.

The generation of the network configuration representation can be incorporated into a trouble ticket and/or can be graphically depicting the network configuration to portray routers and connections therebetween.

In some embodiments, a graphical user interface can be provided so that the computing device can receive an identification from a user of a source router and a destination router.

Other objects and features of the present invention will become apparent from the following detailed description considered in conjunction with the accompanying drawings. It is to be understood, however, that the drawings are designed as an illustration only and not as a definition of the limits of the invention.

BRIEF DESCRIPTION OF THE DRAWINGS

FIGS. 3A-C show XML schema to facilate generation of XML representations by the network tracing engine;

FIGS. 4A-B show exemplary XML representations that can be generated by the network tracing engine;

FIG. 5 shows an exemplary graphical depiction as a network diagram of a network based on trace information;

FIG. 8 is a block diagram of an exemplary computing device for implementing the network trace engine; and FIG. 9 is an exemplary distributed system for implementing a distributed embodiment of the network trace engine.

DETAILED DESCRIPTION OF THE PREFERRED EMBODIMENTS

Figure 1:
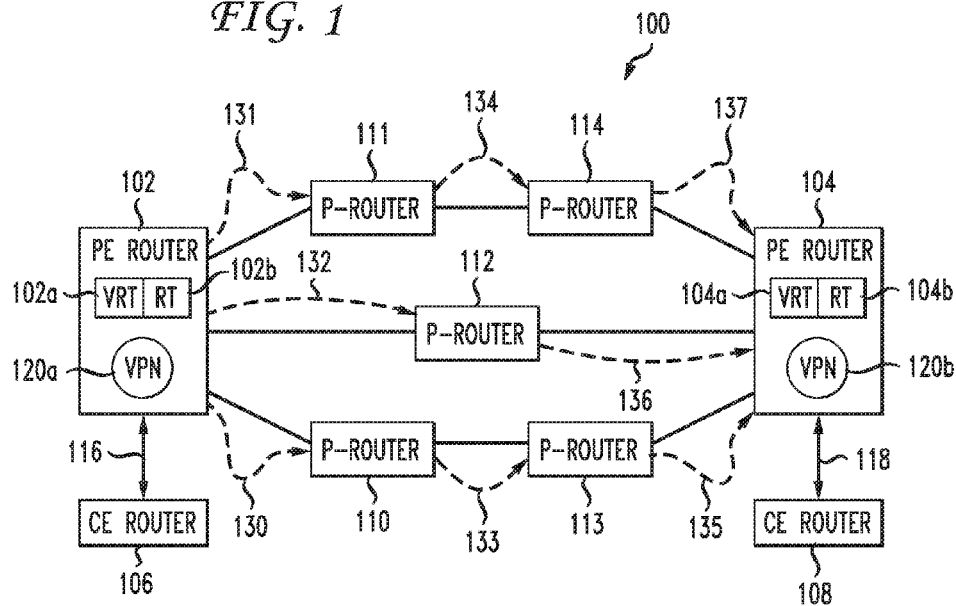
FIG. 1 shows a MPLS network in accordance with preferred embodiments of the present invention.

The preferred embodiments of the present invention are directed to a network tracing engine for tracing and depicting a topology of a network using a network diagram. The network tracing engine preferably queries/telnets to interfaces of routers associated with one or more source-to-destination paths in a network concurrently and independently to ensure proper configuration of the routers and/or to generate a true depiction of a network configuration representation using, for example, the Telnet protocol and CLI commands known to those skilled in the art. A network configuration representation can be, but is not limited to a network diagram, which depicts routers as a block diagram, a textual listing of routers and there interconnections, a tree diagram, or the like. Trace information is preferably gathered and recorded for hops in a way that completely defines their place in and/or contribution to the paths supported by the hops.

The terms querying and telnetting are used interchangeably and as used herein refer to requesting information from one or more routers. A source-to-destination path is a route that information travels through a network from one provider edge router (i.e. a source) to another provider edge router (i.e. a destination). The soure router represents an entry point of data traffic flowing into a network and the destination router represents an exit point of the data traffic flowing out of the network. The queried routers along the one or more source-to-destination paths return trace information associated with the queried routers. Trace information represents information corresponding to a configuration of the routers and can include, for example, Label Distribution Protocol (LDP) information, such as label bindings assigned to data packets by routers, next hop addresses, interface names, incoming/outgoing interfaces, and the like.

The network tracing engine allows for concurrent tracing of equal cost multipaths (ECMPs) in a network using threading techniques. Threads or trace threads, as used herein, refer to traces that are preferably independently and concurrently executed by the network tracing engine. For example, when a path diverges in multiple paths multiple trace threads can be inialized to trace the multiple paths. If the paths converge, a single thread can continue tracing the path and the other threads can terminate at the convergence point to prevent redundant tracing. As a result, the network tracing engine can perform tracing quickly and efficiently.

The preferred embodiments of present invention enable an intuitive and accurate depiction of a network topology based on the trace information obtained as a result of querying the routers along the one or more ECMPs. The trace results are preferably formatted using an extensible mark-up language (XML) representation which is preferably used to generate a graphical depiction of the network topology (i.e. a network diagram). The depiction can be formed dynamically as the routers are being queried such that as more trace information is obtained, the depiction of the trace results becomes more developed.

The preferred embodiments minimize network traversal/tracing performance to a level that is suitable for human (and automated request) consumption. These advantages over conventional approaches grow as path complexity grows. Results of the present approach can be communicated graphically or textually and can be a human readable or machine-readable portrayal of the network diagram with highlighted trouble areas. The time required to obtain results with conventional approaches grows substantially as the path complexity grows, and can exceed 45 minutes for the more complex cases. For present approach can obtain results in under about 1 min and 34 seconds, thereby resulting in significant improvement in maintenance diagnosis and repair cycles.

When trace results are added to a trouble ticket generated by an automated diagnostic engine, the delay in trouble ticket generation remains within the acceptable range due to the efficient tracing techniques described herein. A trouble ticket provides a network technician with information regarding possible network problems, such as equiopment failures. The preferred embodiments, therefore, provide a network technician with information on the trouble ticket that can reduce the time required for locating problems in the network. As result, the efficiency of network maintenance can be increased while the cost of network maintenance can be decreased.

When a trace results are presented via a GUI in response to a user request, information is fed to the GUI as it is collected so that the user gets usable information as quickly as possible. The information associated with a node preferably contains information required to completely describe its place in a network diagram; thereby enabling incrementally depicting a network diagram as the trace is performed.

As such, the network tracing engine allows service providers to acquire quick, on-demand access to accurate and current (i.e., network derived) network diagrams of the complete ECMP path set between two specified network edge points (PEs) in an MPLS network.

FIG. 1 shows a Multiprotocol Label Switching (MPLS) network 100 in accordance with preferred embodiments of the present invention. In one preferred embodiment, as shown in FIG. 1, the network 100 is configured to provide Virtual Private Network (VPN) connection services using MPLS and may include physical network components (i.e. nodes), e.g., routers, computer systems, disk drives, etc., and logical network components, e.g., software, application software, ports, etc. It will be appreciated by one skilled in the art that the present invention is not limited to a MPLS-VPN network and other network communication configurations may benefit from the present invention.

The network 100 is a LDP enabled network and can include provider edge (PE) router 102, PE router 104, customer edge (CE) router 106, CE router 108, and provider routers (P-routers) 110-114. The PE routers 102 and 104 are preferably located at the periphery of the network 100 to allow customers to connect to the network 100 and configured to allow a VPN identifying label to be set. The PE routers 102 and 104 are network units located at an ingress location 116 and egress location 118 of the network 100 and facilitate construction of VPN 120*a-b*. Although VPN 120*a-b* is illustrated in FIG. 1, the present invention is not limited to a single VPN and may be deployed in a networking environment supporting one or more VPNs.

CE routers 106 and 108 connect to the PE routers 102 and 104, respectively, and connect the VPN 120 to the network 100. In some embodiments, the CE routers 106 and 108 provide the PE routers 102 and 104 with route information for establishing the VPN 120.

As shown in FIG. 1, P-Routers 110-114 are provided in the network 100 and are preferably Label Switch Routers (LSRs) used to forward traffic (i.e. information) to and from the VPN sites 120a-b. In one preferred embodiment, the P-Routers 110-114 and PE routers 102 and 104 transmit information over the network 100 using a MPLS enabled protocol. For example, in one preferred embodiment, the LDP is employed by the P-Routers 110-114 to establish Label Switched Paths (LSPs) 130-137 through the network 100 by mapping network-layer routing information directly to the data-link layer switched paths.

The P-routers 110-114 can provide equal cost multiple path (ECMP) routing between PE router 102 and PE router 104. ECMPs as used herein refer to equal cost paths that have a substantially equal likelihood of being followed by packet in the network and usually represent the preferred paths. The term cost, as used herein, refers to a router metric that determines the likelihood that a router interface is to be used to forward data traffic. Thus, equal cost paths, as used herein, refers to multiple data traffic paths (i.e. ECMPs) that have the same likelihood of being used to forward data traffic. For example, in the present example, there are three ECMPs that a packet can follow from the PE router 102 (i.e. the source) to the PE router 104 (i.e. the destination). For the first ECMP, a packet can pass through the PE router 102, P-router 110, P-router 113, and the PE router 104. For a second ECMP, a packet can travel through the PE router 102, P-router 112, and the PE router 104. For a third ECMP, a packet can travel through the PE router 102, P-router 111, P-router 114, and the PE router 104.

The PE routers 102 and 104 may each be configured to include a Virtual Routing and Forwarding (VRF) module 102a and 104a, respectively, and a Routing Table (RT) 102b and 104b, respectively. The VRF modules 102a and 104a and the RTs 102b and 104b define one or more routes that packets travel. RTs 102b and 104b are associated with VPNs. The VRF modules 102a and 104a use the RTs 102b and 104b to determine a next hop in the network 100 for a MPLS label reference. A next hop, as used herein, refers to the next node or router in the path that is selected to receive the packet.

For example, in one preferred embodiment, given a packet of information sent from one part of the VPN 120a to the network 100, the source PE-router 102 determines a destination for the packet in accordance with the RT 102b accessible to the VRF module 104a. The PE-router 102 encapsulates the packet in a messaging format in accordance with a destination. In one preferred embodiment, the messaging format includes data, an Internet Protocol header and a set of MPLS labels. The labels represent either an identifying label for a second part of the VPN 120b or a label for transfer along the LSPs meant for the destination PE-router 104.

Once the packet is encapsulated by the source PE-router 102, the packet is transferred to one of the P-Routers 110-112 over one of the LSPs 130-132 using the VRF module 102a and RT 102b of the source PE-router 102. The receiving P-Router, for example, P-Router 110, executes label switching on the basis of one or more MPLS labels included in the packet. In one preferred embodiment, the P-Router 110 replaces a first MPLS label with a second MPLS label and transfers the resulting packet to another P-Router 113. This second P-Router 113 then may transmit the resulting packet to the destination PE-router 104 over another LSP 133. The destination PE-router 104 removes the MPLS labels from the packet and using the VRF module 104a and RT 104b of the destination PE-router 104, delivers the packet to the VPN site 120, thereby facilitating a MPLS-VPN service.

In particular, the P-Routers 110-114 map the incoming label and incoming port information into an outgoing label and outgoing port. In some preferred embodiments, the incoming port is the identifier of the network interface at which a packet arrives and the outgoing port is the identifier of the network interface through which the packet will be transmitted. In one preferred embodiment, the P-Routers 110-114 base their forwarding decisions on the MPLS label and incoming port combination. In some preferred embodiments, for example, the core MPLS nodes (i.e. P-Routers) 110-114 may replace the MPLS label in the incoming packet with a new MPLS label in the outgoing packet and transmit the new packet via the outgoing port.

Figure 2:
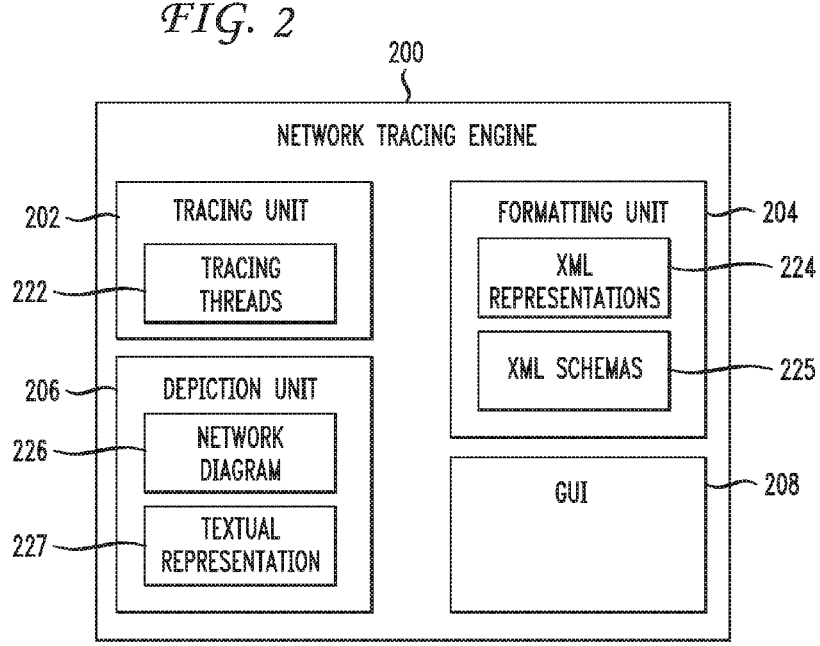
FIG. 2 is a block diagram of a preferred embodiment of a network tracing engine.

FIG. 2 shows a block diagram of a preferred embodiment of a network tracing engine 200 for tracing ECMPs in a network. The network tracing engine is preferably implemented using a programming or scripting language that supports programming with threads, such as JAVA, Python, C/C++(with supporting libraries), or the like and is preferably implemented as a web-based tool. The network tracing engine 200 can include a tracing unit 202, formatting unit 204, depiction unit 206, and a graphical user interface (GUI) 208.

The tracing unit 202 can telnet to routers along one or more ECMPs based on a selected source PE router and a selected destination PE router and can use CLI commands known to those skilled in the art to gather trace information from the routers along the ECMPs. The tracing unit 202 can implement trace threads 222 for ECMPs that have one or more divergent points. A divergent point represents a router interface that links to multiple next hops such that there is more than one path for the tracing unit 202 to trace. To trace multiple paths from divergent points, the tracing unit 202 can use a multi-thread approach so that the multiple paths formed at the divergent point are traced concurrently by corresponding trace threads 222. Paths in a network can converge at convergent point, which as used herein refers to a router interface at which multiple path come together. When divergent paths converge at a convergent point and generally, the tracing unit 202 prevents repetively telnetting to a router interface, such as a convergent point. For example, when two paths converge at a router interface, the first trace thread to reach the router interface queries the router to get the trace information and the second trace thread terminates prior to telnetting to the router interface at the convergent point.

The formatting unit 204 can format the trace information and output the trace information in an XML representation 224 or other suitable representations that allow for graphically depicting network topologies. The formatting unit can format and output the trace information as each hop is visited by the network tracing engine 200 such that tracing information is delivered as it is collected, which is referred to hearin as streaming mode. The streaming mode can be used for applications for which an immediate response is desired, such as with a user interface. Alternatively, the formatting unit 204 can output the tracing information once the tracing of the network is complete, which is referred to herein as summary mode. As result, the summary mode preferably withholds the formatted output until all information is gathered.

The XML representations 224 are defined with XML schemas 225 for both the streaming mode and the summary mode. Preferably, the schemas 225 used do not declare a namespace for the trace related element definitions, unless policy requires. If a namespace is declared, it will apply to all of the tags defined for the trace domain. Therefore, there would be no need for trace to use namespace prefixes for those tags in the generated document instances.

In streaming mode, the network tracing engine preferably sends a start XML document instance to mark the start of a trace. Subsequently, a NodeReport XML document instance is sent for node/router interfaces visited during the trace. An end XML document instance is preferably sent to mark the end of a trace. FIGS. 3A-B shows an exemplary XML schema for the streaming mode and FIG. 3C shows an exemplary XML schema for the summary mode. FIG. 4A shows a portion of an exemplary XML representation that can be output by the formatting unit 204 operating in streaming mode and FIG. 4B shows a portion of an exemplary XML representation that can be output by the formatting unit 204 operating in summary mode.

A start document instance contains a unique TraceID, trace StartTime, Source PE, and Destination PE. For nodes/hops visited during the trace, a NodeReport document instance is preferably generated. Nodes/hops preferably contain the same unique TraceID, HopAdddr, HopIntfceName, Hostname, IntfceName, IntfceAddr, Type, LDPStatus, InLabel, and OutLabel for the path being traced. A node/hop can connect to any number of next nodes/hops, each of these are preferably recorded by a NextHopAddr element. For LDPStatus, a value of 1 means that LDP is enabled/up/active for that hop interface, a 0 means it's disabled/down/inactive. InLabel and OutLabel contain the corresponding labels being used by the router for the interfaces connecting the two hops. The OutLabel for a given hop and path should match the InLabel on the next hop for that path. A label discrepancy or label mismatch occurs when this is not the case. The end document instance contains the same unique TraceID, trace StartTime, trace EndTime, Source PE, and Destination PE.

If an error occurs while collecting information for a hop (e.g., inability to connect to a router, inability to login to a router, a session timeout, an unexpected response from a router, resource limitations, and the like), it is recorded in an Error element instance for the corresponding NodeReport document instance and is also preferably recorded in an Error element instance for the end document instance.

Referring again to FIG. 2, the depiction unit 206 can receive the XML representation as it is formatted or can receive a complete XML representation. The depiction unit can generate a graphical depiction of the network topology, such as a network diagram 226 based on the XML representation. For embodiments, that receive the XML representation as it is being collected, the graphical depiction can be formed dynamically as the network is being traced. As a result, a user can observe the progress of a trace and whether any problems have occurred. For embodiments that receive a complete XML representation, the formatting unit can generate a graphical depiction of the network topology that represents a single complete, explicitly machine-parseable, description of the trace results, which can be readily delivered in a simple query-response fashion and can be fed to a text-based trouble ticketing system.

In an alternative embodiment, the network tracing engine can present the trace information about hops in a non-XML based and/or non-graphical format using text-based format (i.e. a textual representation 227). The format of a textual line for trace information corresponding to a hop is described as follows. The beginning of a line is preferably the incoming hop interface address for the hop being described followed by a delimited list of one or more next hop incoming interface addresses. If the line does not represent the source or destination interface, then the line preferably contains LDP information in the form of name-value pairs. The first name=value pair, LDP=n, indicates the status of LDP, if n is 0 LDP is disabled, if n is 1 LDP is enabled. The remaining name=value pairs show incoming and outgoing labels. The next text element is preferably the router host name. If the line does not represent the source or destination, the next two fields are preferably the outgoing interface name and address, respectively. Otherwise, the next two fields are preferably the MPLS loopback interface name and address. The time taken to visit the hop is preferably recorded at the end of the line.

FIG. 5 shows an exemplary network configuration representation 500 of a network configuration that can be generated by the depiction unit 206. The network configuration representation 500 can correspond to the XML representations of FIGS. 4A and 4B and can include source and destination PE routers 510, P-Routers 515, and connecting lines 520 to represent connections between the routers 510 and 515. Trace information, such as IP addresses, next hop addresses, router interface names, and the like can be included in the network configuration representation 500. The routers can have a name, such as name 511 and one or more interfaces, such as interface 512 and 513. The graphical depiction can permit user interaction. For example, in some embodiments, a user can zoom in on particular sections of the network configuration representation 500 and/or can select one or more of the nodes 510 to view addition trace information that may not be readily viewable in the network configuration representation 500.

The network configuration representation can be used to diagnose problems associated with routers in the ECMPs, such as LDP errors. During a trace, if a problem is encountered, the corresponding router in which the problem exists can be identified on the network configuration representation 500 by highlighting the router or by using other suitable identifications. In addition, or alternatively, the grapghical representation and/or a textual representation can be included in a trouble ticket so that a techian can determine the network configuration and locate routers of interest.

Figure 6:
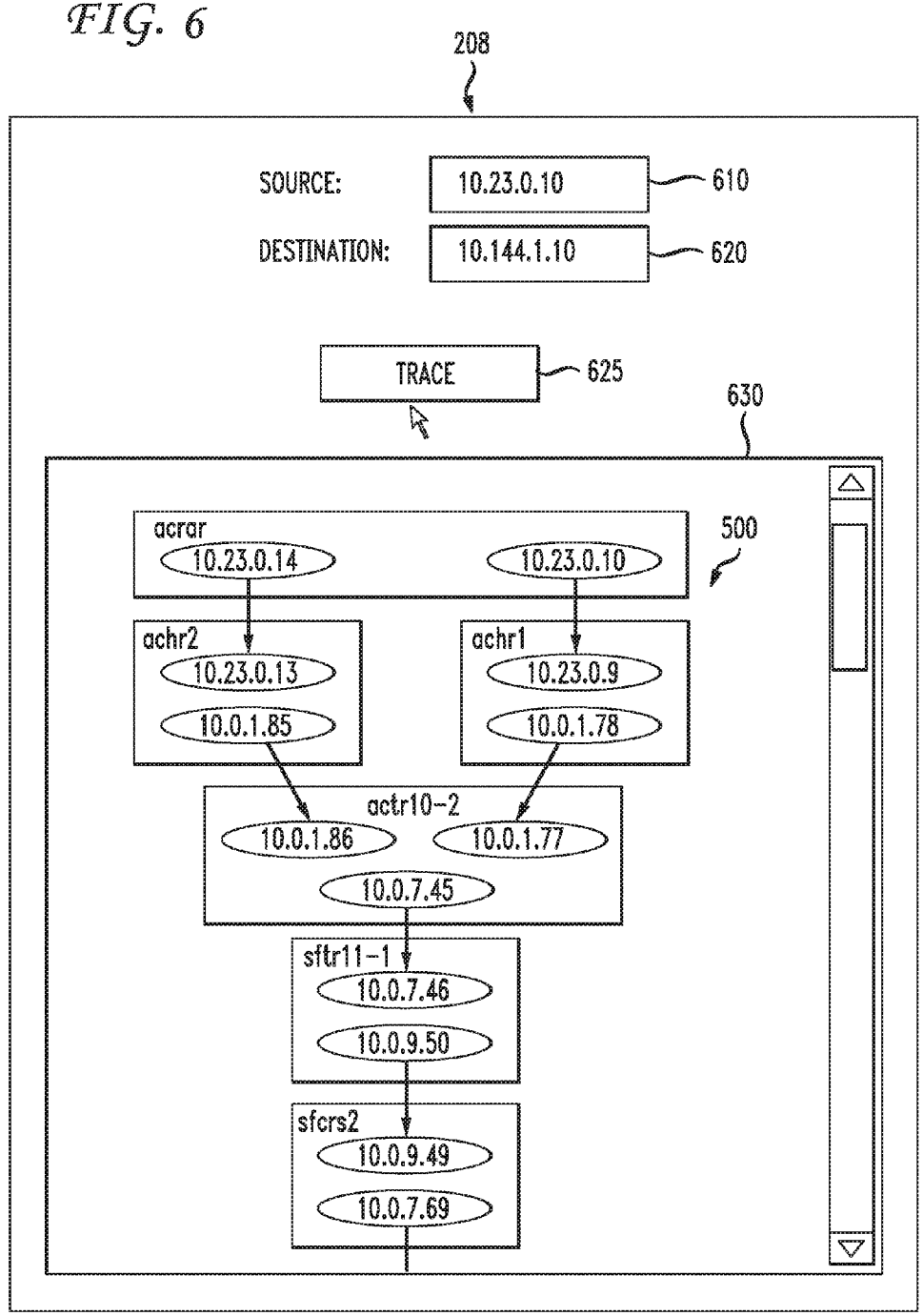
FIG. 6 shows a preferred embodiment of a GUI of the network tracing engine.

The GUI 208 can provide a user with an interface for inputting information. In one embodiment, the network tracing engine can be invoked manually using the GUI 208. FIG. 6 shows a preferred embodiment of the GUI 208. The GUI 208 can include input fields 610, input field 620, activation button 625 that when selected activates the trace, and display area 630. The input field 610 allows a user to input source PE router information, such as an IP address for the source PE router. The input field 620 allows a user to input destination PE router information, such as an IP address of the destination PE router. The tracing unit 202 uses the entered source and destination PE router information to trace the ECMPs between the source and destination PE routers. The display area 630 is an area in the GUI 208 that displays the graphical depiction (e.g., network configuration representation 500) to a user.

Figure 7A:
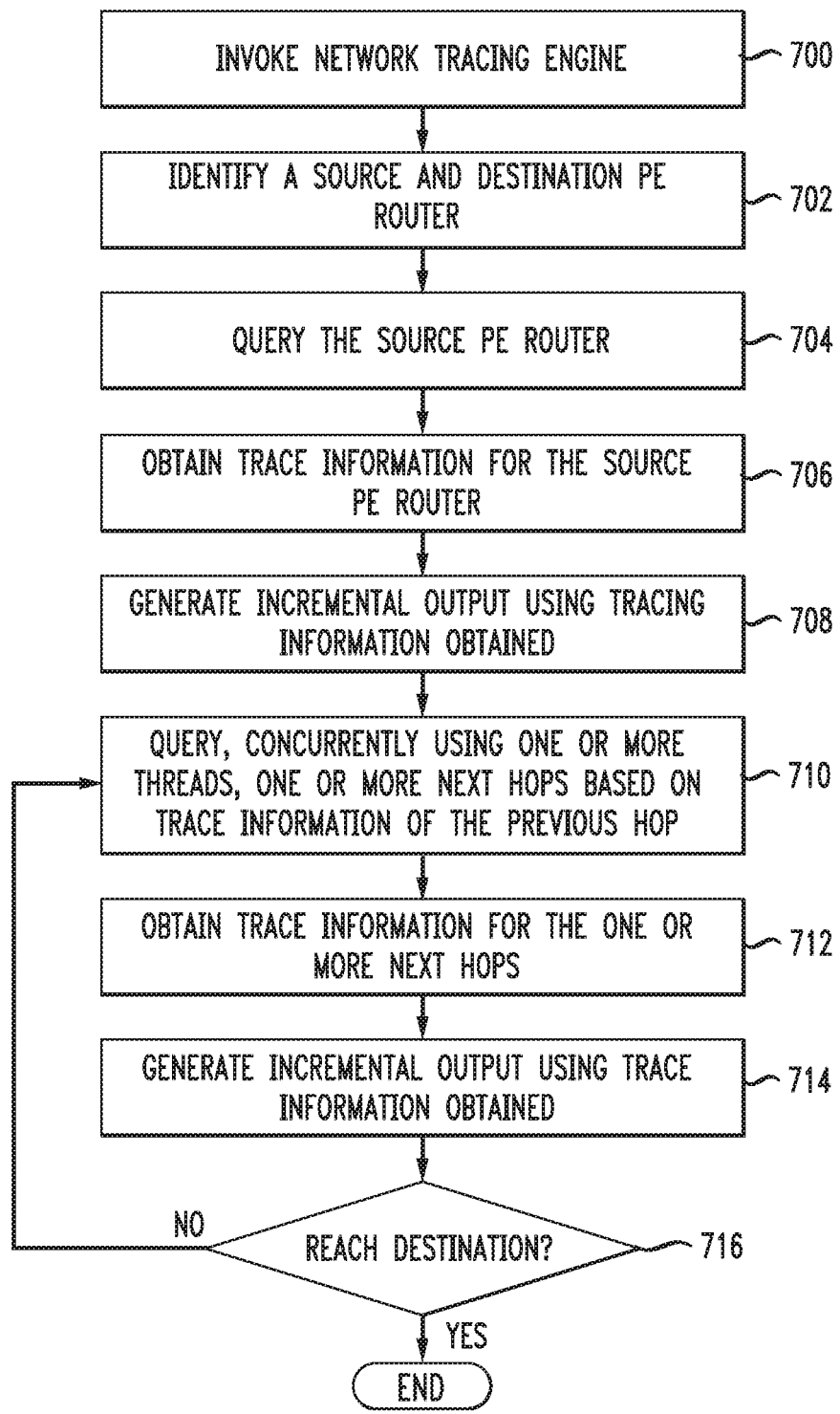
FIGS. 7A-B show flowcharts for implementing preferred embodiments for performing tracing using the network trace engine.

FIG. 7A is a flowchart that shows a preferred implementation for tracing and depicting a topology of the network 100 in streaming mode. The network tracing engine can be invoked automatically by a diagnostic engine used for diagnosing network failures and generating trouble tickets or can be invoked manually by a user (step 700). For the case where manual invocation is used, the GUI 208 can be provided to allow a user to enter a source and destination PE router.

Initially, the network tracing engine can identify source and destination PE routers (step 702) and can query the source PE router for next hops along one or more ECMPs to the destination PE router (step 704). The source PE router can return trace information that includes, but is not limited to one or more next hop address, LDP label information, one or more interface names associated with the source PE router, incoming/outgoing interface, and the like (step 706). An incremental output is generated using the trace information from the source PE router (step 708). The trace information preferably provides a complete definition of the place in and/or contribution to one or more ECMPs associated with the identified source-to destination pair for the associated hop, in this case the source PE router. The incremental ouput is preferably a generated by the formatting unit based on a XML representation of the trace information.

Subsequently, the network tracing engine can concurrently telnet to one or more router interfaces that represent one or more next hops based on the trace information received using one or more trace threads (step 710). In the case where there are multiple next hops, the network tracing engine creates multiple threads such that the threads follow the paths associated with a corresponding next hop. Trace information from the one or more next hops is obtained (step 712) and the ouput is incrementally updated to include a depiction of the next hops (step 714). For the case where a next hop represents a convergent point at which multiple threads would converge, trace information is obtained via a query by the first thread to visit that hop, and any subsequent threads to visit that same hop can re-use/link to the trace information being collected by the first thread, from this hop onward to the destination. The trace information preferably provides a complete definition of the place in and/or contribution to one or more ECMPs associated with the identified source-to destination pair for the associated hop. The incremental ouput is preferably generated based on an XML representation of the trace information generated by the formatting unit. When the network tracing engine determines that the destination is reached by trace threads tracing the ECMPs (e.g., all trace threads via all ECMP paths) (step 716), the trace is complete and a network diagram that provides an accurate depiction of the current network configuration. If the destination is not reached (step 716), the network tracing engine loops to step 710.

Figure 7B:
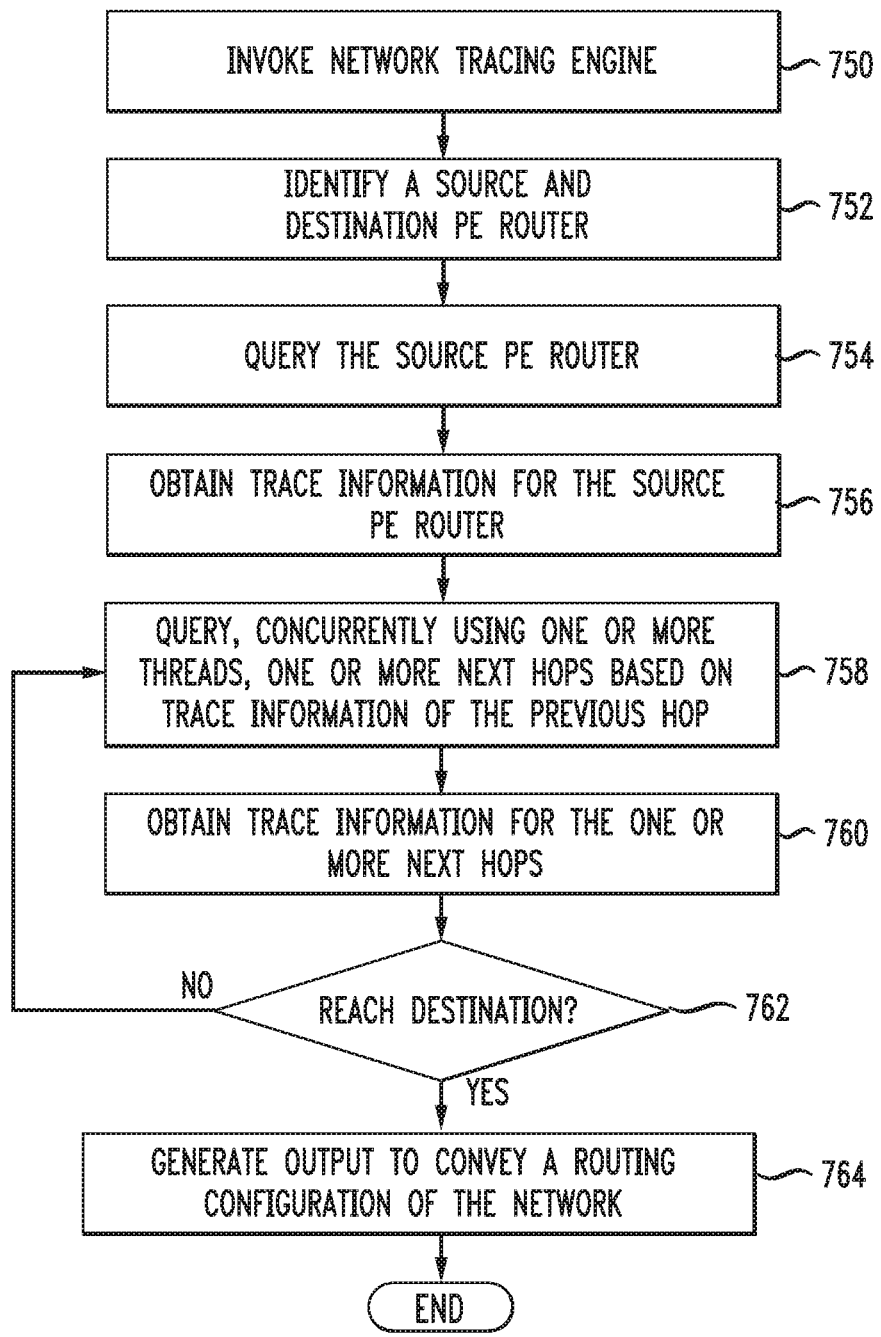

FIG. 7B is a flowchart that shows a preferred implementation for tracing and depicting a topology of the network 100 in streaming mode. The network tracing engine can be invoked automatically by a diagnostic engine used for diagnosing network failures and generating trouble tickets or can be invoked manually by a user (step 750). For the case where manual invocation is used, the GUI 208 can be provided to allow a user to enter a source and destination PE router.

Initially, the network tracing engine can identify source and destination PE routers (step 752) and can query the source PE router for next hops along one or more ECMPs to the destination PE router (step 754). The source PE router can return trace information that includes, but is not limited to one or more next hop address, LDP label information, one or more interface names associated with the source PE router, incoming/outgoing interface, and the like (step 756). The trace information preferably provides a complete definition of the place in and/or contribution to one or more ECMPs associated with the identified source-to destination pair for the associated hop, in this case the source PE router.

Subsequently, the network tracing engine can concurrently telnet to one or more router interfaces that represent one or more next hops based on the trace information received using one or more trace threads (step 758). In the case where there are multiple next hops, the network tracing engine creates multiple threads such that the threads follow the paths associated with a corresponding next hop. Trace information from the one or more next hops is obtained (step 760). The trace information preferably provides a complete definition of the place in and/or contribution to one or more ECMPs associated with the identified source-to destination pair for the associated hop. For the case where a next hop represents a convergent point at which multiple threads would converge, trace information is obtained via a query by the first thread to visit that hop, and any subsequent threads to visit that same hop can re-use/link to the trace information being collected by the first thread, from this hop onward to the destination. When the network tracing engine determines that the destination is reached by trace threads that are tracing the ECMPs (step 762), the trace is complete and a network diagram is generated that provides an accurate depiction of the current network configuration (step 764). The network diagram is preferably generated from an XML representation of the trace information generated by the formatting unit. If the destination is not reached (step 762), the network tracing engine loops to step 758.

Figure 7C:
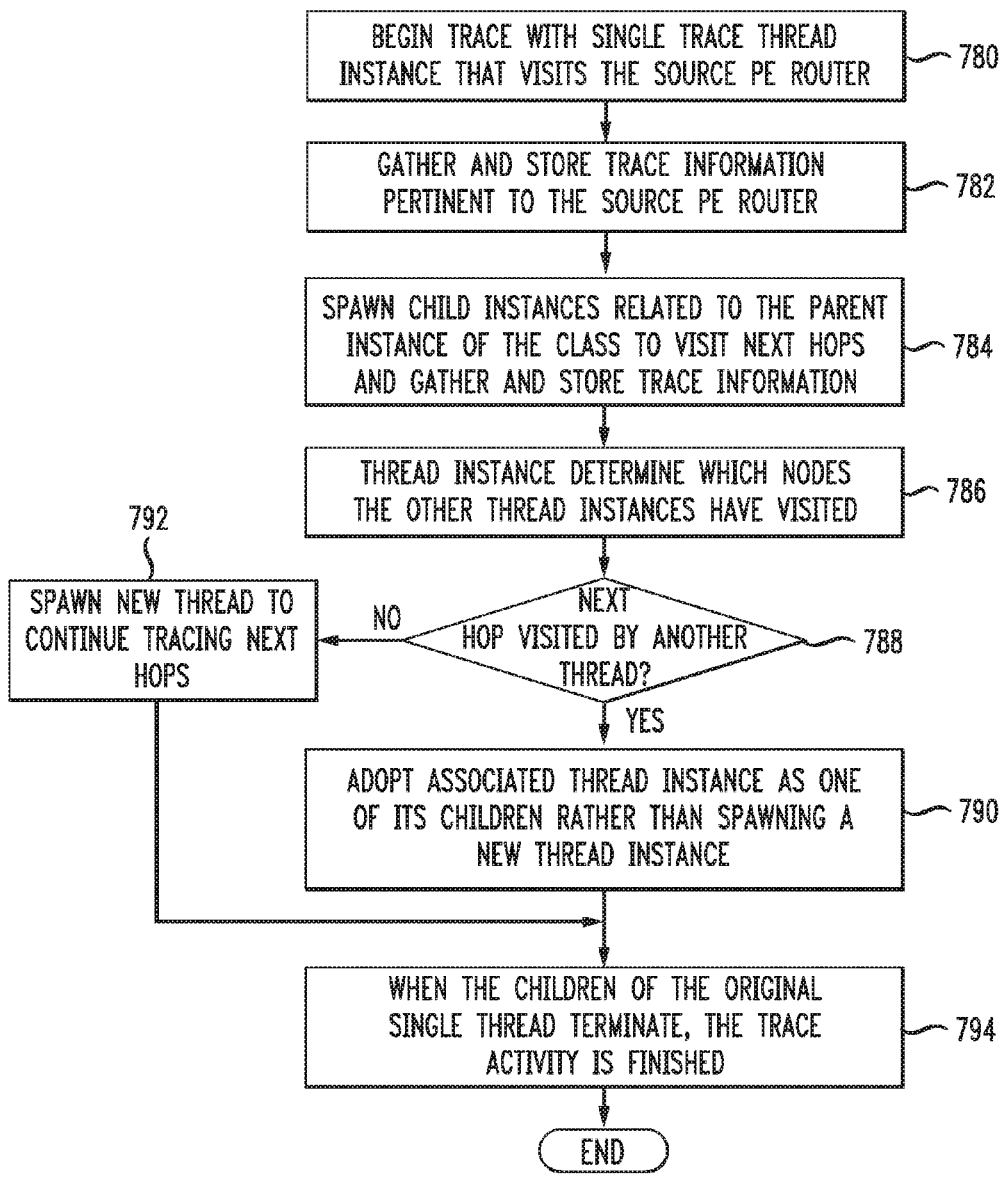
FIG. 7C shows a flowchart for implementing trace threads in accordance with a preferred embodiment of the present invention.

FIG. 7C is a flowchart showing the use of threads for tracing ECMPs in an MPLS network in more detail. A trace begins with a single trace thread instance, referred to herein as a parent trace thread, that visits the source PE router (step 780). This thread represents an instance of a class that preferably gathers and stores trace information pertinent to the node (step 782). Subsequently, the trace thread instance of the class spawns child trace thread instances of itself to do the same for subsequent next hops from the PE router to the destination PE router (step 784). This behavior progresses recursively until there are no next hops, i.e., the destination PE has been reached. A child trace thread, as used herein, refers to a trace thread instance that is associated with the parent trace thread in that children trace threads are descendents of the parent trace thread, although they can be several generations removed. For example, a parent trace thread can spawn a child trace thread, which in turn can spawn another child trace thread. The first child trace being one generation removed from the parent trace thread and the second child trace thread (also referred to as a grandchild) being two generations removed from the parent trace thread. If a thread encounters a problem while gathering node information, it terminates with an error. Each thread instance can determine which nodes the other thread instances have visited (step 786). If one of its next hops has been visited by another thread (step 788), it adopts the associated thread instance as one of its children rather than spawning a new thread instance (step 790). These thread instances will wait for their children to terminate before they terminate. Otherwise, the thread spawns new thread to continue tracing next hops (step 792). When the children of the original single thread (i.e. the thread for the source PE router) terminates, the trace activity is finished (step 794). If no children terminated prematurely (with errors), the trace is complete. For emdoiments where sequential/incremental output is desired (i.e. streaming mode), each thread instance preferably reports its node information as it is collected. For emodiments where batch output is desired (i.e. summary mode), the trace information is preferably retrieved from the trace instances when the trace is complete.

As one example, a single trace thread can visit the source PE router 102 and can spawn first, second, and third childern trace threads to visit P-routers 110-112, respectively. The first through third children trace threads can spawn fourth, fifth, and sixth children trace threads, respectively, which visit P-router 113, destination PE router 104, and P-router 114, respectively. Since the fifth child trace route as already reached, and therefore, collected trace information for the destination PE router 104, the fourth and sixth children trace threads can simply use the collected trace information instead of querying the destination destination PE router. In an alternative embodiment, one child trace thread can be spawned for each ECMP so that the children trace threads collect trace information for the nodes along their corresponding path.

The above described implementations of threads preferable spawn new threads for each node along the ECMPs from the source PE router to the destination PE router such that the number of threads instances spawned matches the number nodes in the ECMPs. The implementions of threads prevent redundant thread instances from being generated, and therefore, prevent unnecessary querying of nodes in the ECMPs. As a result, the ECMPs of a network are traced efficiently to minimize the time required to generate an output conveying the network configuration.

FIG. 8 depicts an exemplary computing device 800 for implementing tracing of an MPLS network with LDP enabled routers in accordance with the preferred embodiment of the present invention. The computing device 800 can be a mainframe, personal computer (PC), laptop computer, workstation, handheld device, such as a PDA, or the like. In the illustrated embodiment, the computing device 800 includes a central processing unit (CPU) 802 and preferably a display device 804. The display device 804 enables the computing device 800 to communicate directly with a user through a visual display. The computing device 800 can further include data entry device(s) 806, such as a keyboard, touch screen, and/or mouse.

The computing device 800 can include storage 808 for storing data, such as trace information, and instructions, such as instruction for executing traces and graphical depictions of network configurations. The storage 808 can include such technologies as a floppy drive, hard drive, tape drive, Flash drive, optical drive, read only memory (ROM), random access memory (RAM), and the like.

Applications, such as the network tracing engine 200 for performing the process described above, can be resident in the storage 808. The storage 808 can be local or remote to the computing device 800 and can include a database 820 to which the computing device 800 can connect via the network 100 or another network. The computing device 800 includes a network interface 812 for communicating over the network 100 to query and receive trace information from the nodes of the network 100 and/or to retrieve or store information in the database 820. The CPU 802 operates to run the application in storage 808 by performing instructions therein and storing data resulting from the performed instructions, which may be depicted via the display 804 or by other mechanisms known to those skilled in the art, such a print out from a printer.

In some embodiments the network tracing engine can be implemented using a distributed system. FIG. 9 shows a distributed system 900 for implementing the network tracing engine 200. The distributed system 900 can be implemented as a client/server configuration, where the clients 910 and servers 920 can be implement using the computing device 800 or other suitable computing device configurations. The distributed system 900 can also include one or more databases 820. In on example, the clients 910 include the tracing unit to query node in the network and receive trace information fom the nodes. The client can also include the formatting unit to generate an XML representation of the trace information. The client can then send the XML representation to the server 920, which can generate a network diagram using the XML representation and can send the network diagram to the client for display to a user.

Although preferred embodiments of the present invention have been described herein with reference to the accompanying drawings, it is to be understood that the invention is not limited to those precise embodiments and that various other changes and modifications may be affected herein by one skilled in the art without departing from the scope or spirit of the invention, and that it is intended to claim all such changes and modifications that fall within the scope of the invention.

What is claimed is:

1. A device to perform operations in a multi-protocol label switching network, comprising:
   a processor; and
   a memory that stores executable instructions that, when executed by the processor, facilitate performance of operations, comprising:
   receiving a first identification of a first edge router associated with a network and a second identification of a second edge router associated with the network;
   sending a parent trace thread to the first edge router to obtain trace information from the first edge router;
   generating child trace threads according to the trace information obtained from the first edge router;
   obtaining trace information associated with a plurality of paths, the trace information being obtained from a plurality of routers by tracing the plurality of paths using the child trace threads that hop from the first edge router to the second edge router via the plurality of routers;
   terminating one of the child trace threads to identify a terminated trace thread in response to two paths of the plurality of paths converging at a converging router of the plurality of routers, wherein the trace information of the terminated trace thread is stored in another trace thread;
   generating a network configuration representation using the trace information associated with the plurality of paths; and
   displaying the network configuration representation on a graphical user interface, wherein the plurality of paths are equal cost paths, and wherein the trace information is obtained by independently and concurrently tracing the plurality of paths using the child trace threads.

2. The device of claim 1, wherein the processor comprises a plurality of processors operating in a distributed processing environment, and wherein the operations further comprise initializing a diverging trace thread in response to one of the paths of the plurality of paths diverging from a diverging router of the plurality of routers.

3. The device of claim 1, wherein the child trace threads terminate before the parent trace thread.

4. The device of claim 1, wherein the first identification of the first edge router and the second identification of the second edge router are received via the graphical user interface.

5. The device of claim 1, wherein the trace information is obtained using the child trace threads associated with the parent trace thread.

6. The device of claim 1, wherein the trace information is obtained by reusing trace information associated with the converging router of the plurality of routers associated with one of the plurality of paths in response to the two paths converging at the converging router.

7. The device of claim 1, wherein the network configuration representation further depicts graphically the network configuration to portray the plurality of routers and connections therebetween.

8. The device of claim 1, wherein the network configuration representation further comprises a trouble ticket.

9. The device of claim 1, wherein the operations further comprise:
   generating a first trace thread to obtain trace information associated with a first router of the plurality of routers in the plurality of paths;
   generating a second trace thread to obtain trace information associated with a second router of the plurality of routers in the plurality of paths, the second router being connected to the first router; and
   generating a third trace thread to obtain trace information associated with a third router of the plurality of routers in the plurality of paths, the third router being connected to the second router.

10. A method of representing a network configuration in a multi-protocol label switching network, comprising:
   receiving, by a system comprising a processor, a first identification of a first edge router associated with a network and a second identification of a second edge router associated with the network;
   sending, by the system, a parent trace thread to the first edge router to obtain trace information from the first edge router;
   generating, by the system, child trace threads according to the trace information obtained from the first edge router;
   obtaining, by the system, trace information associated with a plurality of paths, the trace information being obtained from a plurality of routers by tracing the plurality of paths using the child trace threads that hop from the first edge router to the second edge router via the plurality of routers;
   terminating one of the child trace threads to identify a terminated trace thread in response to two paths of the plurality of paths converging at a converging router of the plurality of routers, wherein the trace information of the terminated trace thread is stored in another trace thread;
   generating, by the system, a network configuration representation using the trace information associated with the plurality of paths; and
   displaying, by the system, the network configuration representation on a graphical user interface, wherein the plurality of paths are equal cost paths, and wherein the trace information is obtained by independently and concurrently tracing the plurality of paths using the child trace threads.

11. The method of claim 10, wherein the processor comprises a plurality of processors operating in a distributed processing environment, and further comprising terminating one of the child trace threads to identify a terminated trace thread in response to two paths converging at a converging router of the plurality of routers, wherein the trace information of the terminated trace thread is stored in another trace thread.

12. The method of claim 11, wherein the trace information is obtained by reusing trace information associated with the converging router of the plurality of routers associated with one of the plurality of paths in response to the two paths converging at the converging router.

13. The method of claim 10, wherein the child trace threads terminate before the parent trace thread.

14. The method of claim 10, wherein the first identification of the first edge router and the second identification of the second edge router are received via the graphical user interface.

15. A machine-readable storage device, comprising executable instructions that, when executed by a processor, facilitate performance of operations in a multi-protocol label switching network, comprising:
   receiving a first identification of a first edge router associated with a network and a second identification of a second edge router associated with the network;
   sending a parent trace thread to the first edge router to obtain trace information from the first edge router;
   generating child trace threads according to the trace information obtained from the first edge router;
   obtaining trace information associated with a plurality of paths, the trace information being obtained from a plurality of routers by tracing the plurality of paths using the child trace threads that hop from the first edge router to the second edge router via the plurality of routers;
   terminating one of the child trace threads to identify a terminated trace thread in response to two paths of the plurality of paths converging at a converging router of the plurality of routers, wherein the trace information of the terminated trace thread is stored in another trace thread;
   generating a network configuration representation using the trace information associated with the plurality of paths; and
   displaying the network configuration representation on a graphical user interface, wherein the plurality of paths are equal cost paths, and wherein the trace information is obtained by independently and concurrently tracing the plurality of paths using the child trace threads.

16. The machine-readable storage device of claim 15, wherein the processor comprises a plurality of processors operating in a distributed processing environment, and wherein the operations further comprise terminating one of the child trace threads to identify a terminated trace thread in response to two paths of the plurality of paths converging at a converging router of the plurality of routers, wherein the trace information of the terminated trace thread is stored in another trace thread.

17. The machine-readable storage device of claim 15, wherein the operations further comprise initializing a diverging trace thread in response to one of the paths of the plurality of paths diverging from a diverging router of the plurality of routers.

* * * * *